United States Patent [19]
Katz et al.

[11] 3,937,208
[45] Feb. 10, 1976

[54] SOLAR COLLECTOR SYSTEM

[75] Inventors: Howard S. Katz, Green Lane; P. Richard Rittelmann, Butler, both of Pa.

[73] Assignee: Sunearth Construction Company, Inc., Milford Square, Pa.

[22] Filed: Jan. 20, 1975

[21] Appl. No.: 542,535

[52] U.S. Cl. ............................... 126/271; 237/1 A
[51] Int. Cl.² ........................................... F24J 3/02
[58] Field of Search ............ 126/270, 271; 237/1 A; 60/641; 165/45.48, 136; 98/88 R; 52/399, 480, 220, 495

[56] References Cited
UNITED STATES PATENTS

| | | | |
|---|---|---|---|
| 2,249,642 | 7/1941 | Turner | 126/271 |
| 2,263,355 | 11/1941 | Fould | 52/495 |
| 2,316,191 | 4/1943 | Sott | 126/271 |
| 3,089,480 | 5/1963 | Duncan | 126/270 |
| 3,563,305 | 2/1971 | Hay | 126/270 |

Primary Examiner—Kenneth W. Sprague
Assistant Examiner—James C. Yeung
Attorney, Agent, or Firm—Seidel, Gonda & Goldhammer

[57] ABSTRACT

A solar collection system is disclosed wherein first and second solar collectors of the fluid circulating type are supported by opposite sides of a mounting member having a recess for receiving a substructure. A header on one collector is coupled to a header on an adjacent collector by way of a flexible conduit extending through openings in the mounting member. The system is designed so that minimum assembly is required at the job site.

13 Claims, 4 Drawing Figures

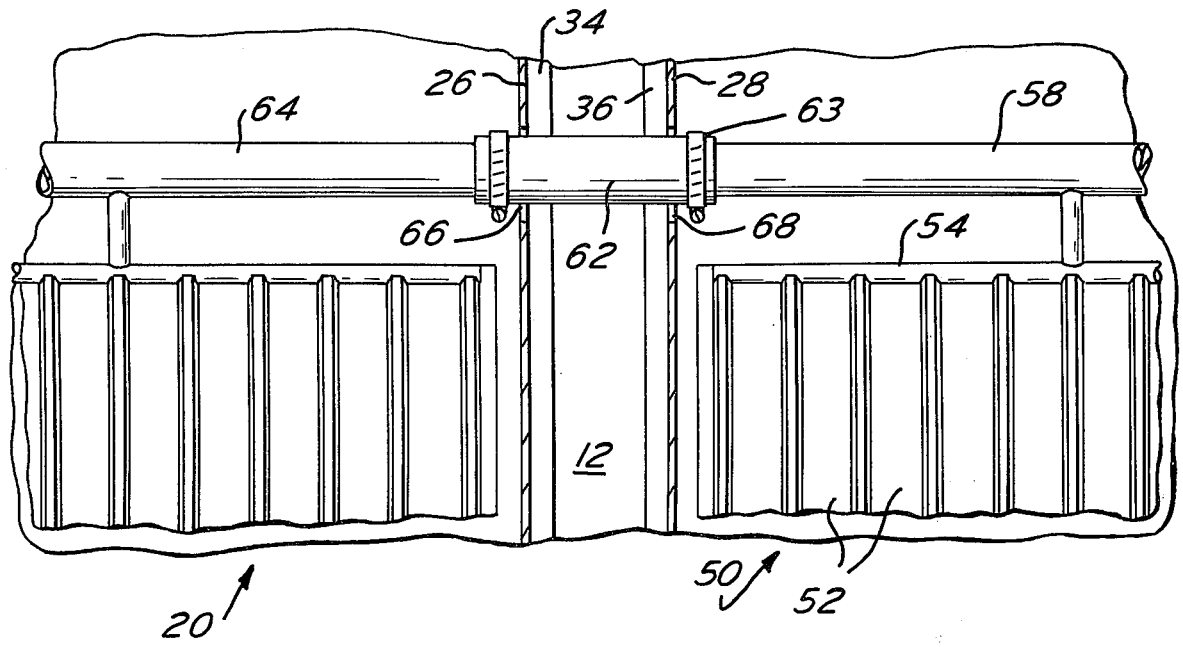
FIG. 2
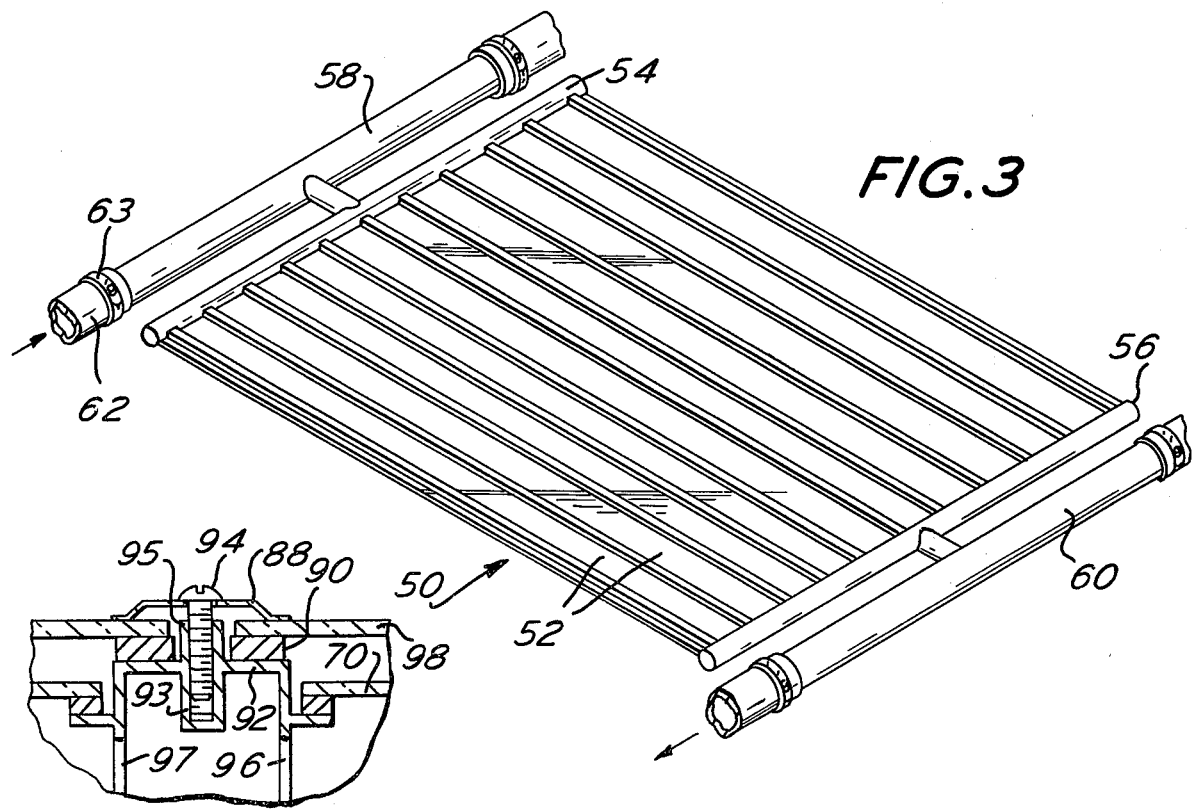
FIG. 3
FIG. 4

SOLAR COLLECTOR SYSTEM

BACKGROUND

A large number of solar collection systems have been proposed heretofore. A major deterent to installation of solar collection systems is the installation and maintenance. Thus, solar collection systems proposed heretofore are structurally interrelated in a manner so as to require a substantial amount of labor in site during installation and result in a system which is difficult to maintain.

The present invention is directed to a solar collection system having a collector mounting member provided with a recess on one side for receiving a substructure. At least one solar collector is positioned on opposite sides of said mounting member. Each of said collectors is partially supported by the mounting member. Each collector has an inlet header and an outlet header interconnected by fluid passages.

A flexible conduit is coupled at one end to a header on one collector and at its other end to a header on the other collector. Hence, the fluid passages of one collector communicate with the fluid passages in a collector on the opposite side of the mounting member by way of the flexible conduit. The mounting member has openings at a location above the recess through which the flexible conduit extends. At least one transparent layer is supported by the end of the mounting member remote from the recess.

In the preferred embodiment, the components of the system are prefabricated at the factory. The flexible conduit has quick release clamps so that it may be rapidly interconnected with headers associated with different solar collectors. Hence, the entire system may be rapidly installed with minimum labor and no cutting of pipes, fitting of joints, and the like.

It is an object of the present invention to provide a novel solar collector system.

It is an object of the present invention to provide a solar collective system which may be prefabricated and capable of being rapidly installed with minimum labor.

It is another object of the present invention to provide a novel mounting member for use in a solar collector system.

Other objects will appear hereinafter.

For the purpose of illustrating the invention, there is shown in the drawings a form which is presently preferred; it being understood, however, that this invention is not limited to the precise arrangements and instrumentalities shown.

FIG. 2 is a sectional view taken along the line 2—2 in FIG. 1.

FIG. 3 is a perspective view of a solar collector.

FIG. 4 is a sectional view of an alternative gasket mounting strip.

Figure 1:
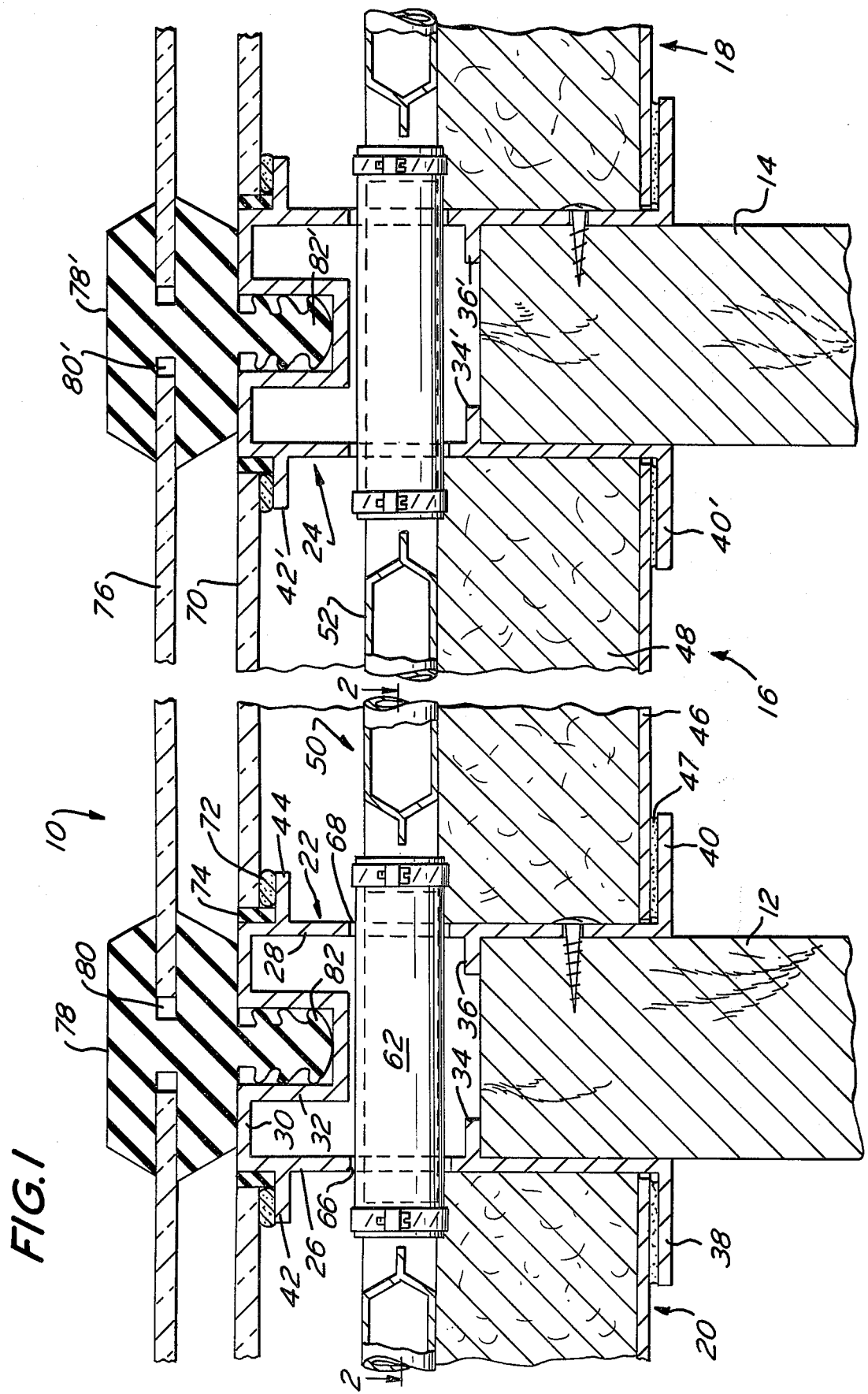
FIG. 1 is a sectional view through a roof embodying the solar collector system of the present invention.

Referring to the drawing in detail, wherein like numerals indicate like elements, there is shown in FIG. 1 a solar collector system in accordance with the present invention designated generally as 10. The system 10 is designed to provide efficient, dependable space heating and domestic hot water heating with ease of installation and maintenance at reasonable costs. The system 10 is part of the roof of an edifice. In a preferred embodiment, the system 10 as shown in FIG. 1 is inclined at an acute angle with respect to the horizontal, such as 45°.

The system 10 includes the substructure 12 and 14 of a roof such as rafters, I-beams, etc. Between adjacent substructures, there is provided one or more of the solar collectors 16, 18, 20. A mounting member 22 is provided for the substructure 12 and a mounting member 24 is provided for the substructure 14. The mounting members 22 and 24 cooperate with each other to support the solar collector 16 disposed therebetween. Thus, each mounting member partially supports a solar collector on opposite sides thereof.

A mounting member is provided for each substructure. The distance between adjacent substructures may be varied as desired. I prefer to space the substructures 12 and 14 so that they are about 32 inches on center.

The mounting members 22 and 24 are identical. Only mounting member 22 will be described in detail with corresponding primed numerals being provided on the mounting member 24. Mounting member 22 is preferably extruded from a lightweight noncorrosive metal such as aluminum. Mounting member 22 has parallel longitudinally extending side walls 26, 28 and a top wall 30 extending therebetween. The top wall 30 is provided with a recessed channel 32 extending along the length thereof.

The mounting member 22 has intermediate walls 34 and 36 extending towards each other from the side walls 26, 28 respectively at approximately the midpoint of the height of the side walls 26, 28. The walls 26, 28, 34, 36 cooperate to define a recess on one side of the mounting member 22 for receiving substructure 12. At the free ends of the side walls 26 and 28, there are provided outwardly extending flanges 38, 40 respectively. Also, outwardly extending flanges 42, 44 are provided on the side walls 26 and 28, respectively, adjacent to the top wall 30. The flanges 42, 44 are shorter than the flanges 38, 40 as shown in FIG. 1.

Each of the solar collectors 16, 18, 20 is identical. Hence, only solar collector 16 will be described in detail. Solar collector 16 includes a layer of insulation 48 provided on its lower surface with a sheet 46 which is a vapor barrier. The sheet 46 is sealed to the flanges 40, 40' by any suitable material such as putty 47. The layer of insulation 48 may be any suitable material but preferably is lightweight rigid insulation such as Fiberglass having a thickness of about 2 inches.

A tube sheet 50 of the fluid circulating type overlies and is supported by the layer of insulation 48. Tube sheet 50 has a plurality of longitudinally extending parallel flow passages 52 and is made from a lightweight noncorrosive material such as aluminum. The width and spacing of the flow passages 52 may be varied as desired. I prefer to use flow passages which are 2½ inches on center. The upper or outward surface of the tube sheet 50 is preferably coated with a black heat absorbing paint or equivalent. In order that the tube sheet 50 may be supported by the layer of insulation 48, the latter is preferably rigid and precut.

The tube sheet 50 may be a fluid circulating expanded metal honeycomb type panel prefabricated to have an inlet header 54 at one end and an outlet header 56 at the other end. See FIG. 3. The header 54 communicates with an inlet manifold 58. The header 56 communicates with an outlet manifold 60. One header on the tube sheet 50 communicates with a header on the tube sheet associated with solar collector 20 by way of a flexible conduit 62.

The flexible conduit 62 is provided with quick release hose clamps 63 on each end. One end of conduit 62 is connected to the manifold 58 while the other end of the conduit 62 is connected to the manifold 64. See FIG. 2.

The mounting member 22 is prefabricated so as to accommodate the flexible conduit 62. See FIGS. 1 and 2, wherein the side walls 26, 28 are provided with openings 66, 68 respectively at an elevation above the elevation of the flanges 34, 36 and below the channel 32. Conduit 62 may interconnect one inlet header with another or one inlet header with an outlet header on the adjacent tube sheet.

An inner layer of transparent material 70 is supported by the flanges 44, 42'. See FIG. 1. A seal 72 is provided between said flanges and the inner layer 70 while a seal 74 is provided between side wall 28 and the side edge of layer 70. Layer 70 is preferably a sheet of ⅛ inch thick double strength glass having an integrated transmisivity of about 87% or more. The seals 72, 74 provide a pressure seal between the layer 70 and the mounting member 22. A similar seal is provided in conjunction with the mounting member 24. The upper surface of layer 70 is substantially flush with the upper surface of top wall 30.

An outer layer of transparent material 76 is provided above and spaced from the layer 70. Layer 76 is preferably a layer of 3/16 inch thick rolled water-white crystal glass with an integrated transmissivity of at least 90.5%. Opposite side edges of layer 76 are supported by gasket mounting strips 78, 78' of resilient material such as neoprene rubber.

The gasket mounting strip 78 is provided with slots on opposite sides thereof for receiving the side edge portion of the layer 76 to provide a water tight seal. Strip 78' is provided with a similar slot 80'. The strips 78, 78' are provided with a longitudinally extending spline or tongue 82, 82'. The tongues are forece-fit into their respective channels on the top wall of their respective mounting members. It will be noted that member 78 has a flat bottom surface which engages the upper surface of the top wall 30 on opposite sides of the channel 32.

In FIG. 4, there is illustrated an alternative mounting strip 88. Member 22' is identical with member 22 except as will be made clear hereinafter. Strip 88 is preferably made from a noncorrosive material such as aluminum with outwardly extending flanges overlying the adjacent edges of a transparent layer of plastic 98 which is UV stable. Heat resistant glazing tape 90 on the top wall 92 of mounting member 22' supports each layer 98. Channel 93 is narrower than channel 32. A self tapping threaded bolt 94 cooperates with the channel 93 at spaced points therealong to retain strip 88 in place. Strip 88 holds each layer 98 against and sealed to the tape 90. Channel 93 does not interfere with the ability to insert a conduit through openings 96, 97. Flanges 95 may be provided as illustrated so as to extend upwardly from wall 92 between adjacent edges of layers of plastic 98. The mounting of strip 88 permits use of layers 98 in a range of thicknesses with the preferred range being .025–.040 inches.

The components of the system as described above are prefabricated and shipped to the installation site. The mounting members, such as members 22, 24 are installed on the substructures. Thus, a substructure is received within the recess on each mounting member. Each mounting member is bolted or otherwise secured to the substructure by way of predrilled holes in the mounting member.

The layer of rigid insulation 48, and the support sheet 46 integral therewith, is then positioned between the flanges 40, 40' and secured in sealing relation therewith. The tube sheet 50 is positioned over the layer 48. Thereafter, the flexible conduit 62 is inserted through the opening 66, 68 and releasably connected to the manifolds on opposite sides of the member 22. The inner layer of glass 70 is positioned and sealed to the flanges 44, 42' with heat insulating sealing materials. Thereafter, the strips 78, 78' with the layer of glass 76 therebetween are force-fit into position to provide a water tight seal with the tongues thereon frictionally held within their respective channels. Alternatively, the strips are attached to their channels by way of a bolt 94 as shown in FIG. 4.

The inlet manifolds are coupled in series with the outlet of a pump which circulates a liquid such as water through the panels. Likewise, the outlet manifolds are connected in series with the heat exchanger of the heating system for the edifice.

A typical installation of the system of the present invention may be as follows. The collector system 10 would have about 700 square feet, would be orientated due south at a tilt of 45° on a residential building in the northeastern portion of the United States. Such building would have a space of 1750 square feet with a space heating load of 20,000 BTU/degree day and a domestic hot water consumption of 80 gallons per day. The system 10 would provide the entire heating load for the building except for the months of November-March during which the system 10 would provide approximately 60% of the heating load. During the months of November-March, auxiliary heating would be utilized to supplement system 10.

It will be noted that during installation, no cutting or fitting of pipes or joints are required other than the attaching of flexible conduits 62 which have quick release clamps on their ends. Due to the location of conduit 62, it does not need any insulation. Thus, installation may be accomplished in a rapid manner with minimum skilled labor.

The mounting members are versatile in their construction so that they may be coupled to a variety of different substructure. In the illustrated embodiment the mounting members 22, 24 are shown with substructure received in the recesses on said members. Other arrangements of substructure are adapted for use with the present invention. The flanges 38, 40 could rest on the upper surface of substructure which is too wide to enter into the recess on member 22. Thus, the substructure can be a planar surface or transverse beams. The flanges 38, 40 are predrilled so that a bolt or screw can secure the flanges to substructure which cannot be accommodated in the recess on member 22.

The present invention may be embodied in other specific forms without departing from the spirit or essential attributes thereof and, accordingly, reference should be made to the appended claims, rather than to the foregoing specification as indicating the scope of the invention.

I Claim:

1. A solar collector system comprising a rigid mounting member having a recess on one side for receiving a substructure, first and second solar collectors, said collectors being on opposite sides of said member and partially supported by said member, each collector having an inlet header and an outlet header interconnected by fluid passages, a conduit coupled at one end to a header of said first collector and coupled at its other end to a header of said second collector, said mounting member having openings at a location above said recess, said conduit extending through said openings, and at least one layer of transparent material above each collector partially supported by and sealed with respect to the end portion of said mounting member which is remote from said recess.

2. A system in accordance with claim 1 wherein said conduit is flexible, said mounting member being generally U-shaped with its open end extending downwardly to define the width of said recess, said end portion including a top wall, the depth of the recess being defined by an intermediate wall parallel to said top wall and closer to the open end of said member as compared with said openings.

3. A system in accordance with claim 2 wherein said top wall is provided with a depending channel, said transparent layer being maintained in position by a gasket mounting strip having a portion extending into said channel.

4. A system in accordance with claim 3 including a second layer of transparent material partially supported by said member at an elevation below and spaced from said first layer of transparent material.

5. A system in accordance with claim 2 wherein said intermediate wall includes first and second wall portions extending toward each other from the side walls of said mounting member.

6. A system in accordance with claim 1 including a second mounting member like and parallel to said first mounting member, said mounting members supporting opposite side edges of one of said collectors disposed therebetween, said mounting members supporting opposite side edge portions of said layer of transparent material.

7. A system in accordance with claim 6 wherein said first and second mounting members have flanges extending towards each other, a rigid layer of insulation material supported by and sealed to said flanges, said one collector being supported by said layer of insulation material.

8. A system in accordance with claim 7 wherein said mounting members have flanges extending towards each other and located adjacent said end portion, a second layer of transparent material supported by said last mentioned flanges and sealed with respect thereto in overlying relation with respect to said one collector, said second layer of transparent material being at an elevation below and spaced from said first layer of transparent material.

9. A system in accordance with claim 3 wherein said gasket strip is resilient and said portion thereof is force-fit into said channel.

10. A system in accordance with claim 3 wherein said gasket strip portion is a threaded member.

11. A solar collector system comprising first and second mounting members having a recess on one side for receiving a substructure, each mounting member being generally U-shaped with its open end and extending downwardly to at least partially define said recess, the depth of the recess being defined by an intermediate wall, said members having a top wall, said top walls having a depending channel, each member having a flange adjacent the entrance of its recess, a solar collector supported on one side of a rigid layer of insulation, a vapor barrier on the opposite side of said layer supported by and sealed to said flanges on said members, said solar collector having an inlet header and an outlet header interconnected by fluid passages, at least one layer of transparent material overlying said solar collector while being supported by and sealed with respect to the top wall of said mounting members, said transparent layer being supported at opposite sides by said top walls by means of a discrete gasket mounting strip having a portion partially extending into its respective channel, a second layer of transparent material having opposite sides supported by said members at an elevation below and spaced from said first layer of transparent material but above said solar collector, and at least one of said members having passage means through which a conduit may extend to one of said headers.

12. An article of manufacture for use in a solar collector system for supporting adjacent solar collector panels and at least one overlying sheet of transparent material from substructure comprising a rigid inverted U-shaped member having side walls interconnected by a top wall, outwardly directed flanges at the free end of said side walls, a channel extending inwardly from said top wall, an intermediate wall cooperating with at least one of the side walls to define a recess for receiving a portion of substructure, each side wall having an opening at a location between said intermediate wall and said channel for receiving a conduit adapted to extend therethrough.

13. An article of manufacture in accordance with claim 12 including outwardly extending flanges on said side walls adjacent said top wall, said last mentioned flanges being shorter than said first mentioned flanges at the free ends of said side walls.

* * * * *